United States Patent [19]

Shackelford et al.

[11] Patent Number: 4,474,341
[45] Date of Patent: * Oct. 2, 1984

[54] UNIFORM DRAG SYSTEM FOR SPIN CAST REELS

[75] Inventors: John T. Shackelford, Littleton, Colo.; Robert L. Carpenter, Tulsa, Okla.

[73] Assignee: Brunswick Corporation, Skokie, Ill.

[*] Notice: The portion of the term of this patent subsequent to Apr. 5, 2000 has been disclaimed.

[21] Appl. No.: 442,854

[22] Filed: Nov. 18, 1982

Related U.S. Application Data

[62] Division of Ser. No. 289,067, Jul. 31, 1981, Pat. No. 4,378,914.

[51] Int. Cl.³ .............................................. A01K 89/01
[52] U.S. Cl. ........................ 242/84.21 A; 242/84.5 A
[58] Field of Search ................. 242/84.21 A, 84.21 R, 242/84.2 A, 84.5 A

[56] References Cited

U.S. PATENT DOCUMENTS

| | | | |
|---|---|---|---|
| 2,745,607 | 5/1956 | Taggart et al. | 242/84.5 A |
| 3,074,665 | 1/1963 | Morrow | 242/84.21 A |
| 3,093,340 | 6/1963 | Mauborgne | 242/84.21 A |
| 3,224,703 | 12/1965 | Clark | 242/84.21 A |
| 3,255,980 | 6/1966 | Ueno | 242/84.2 A |
| 3,411,230 | 11/1968 | Hopper | 242/84.2 A |
| 3,438,594 | 4/1969 | Belleferrille | 242/84.2 A |
| 3,481,554 | 12/1969 | Hull | 242/84.2 A |
| 3,554,459 | 1/1971 | Matsui | 242/84.21 A |
| 3,697,011 | 10/1972 | Christensen et al. | 242/84.2 A |

Primary Examiner—Billy S. Taylor
Attorney, Agent, or Firm—Wood, Dalton, Phillips, Mason & Rowe

[57] ABSTRACT

This invention comprehends a spinning style fishing reel having a housing with a drag assembly that is actuated by a clutchwheel mounted on a shaft for rotating a gear carried by the shaft. The gear meshes with and rotates a second gear which has an axially facing cam surface engaging with a matching cam surface carried by a member that does not rotate relative to the housing. Turning the clutchwheel rotates the cam surfaces relative to each other to increase or decrease the drag force applied uniformly on the spool.

4 Claims, 14 Drawing Figures

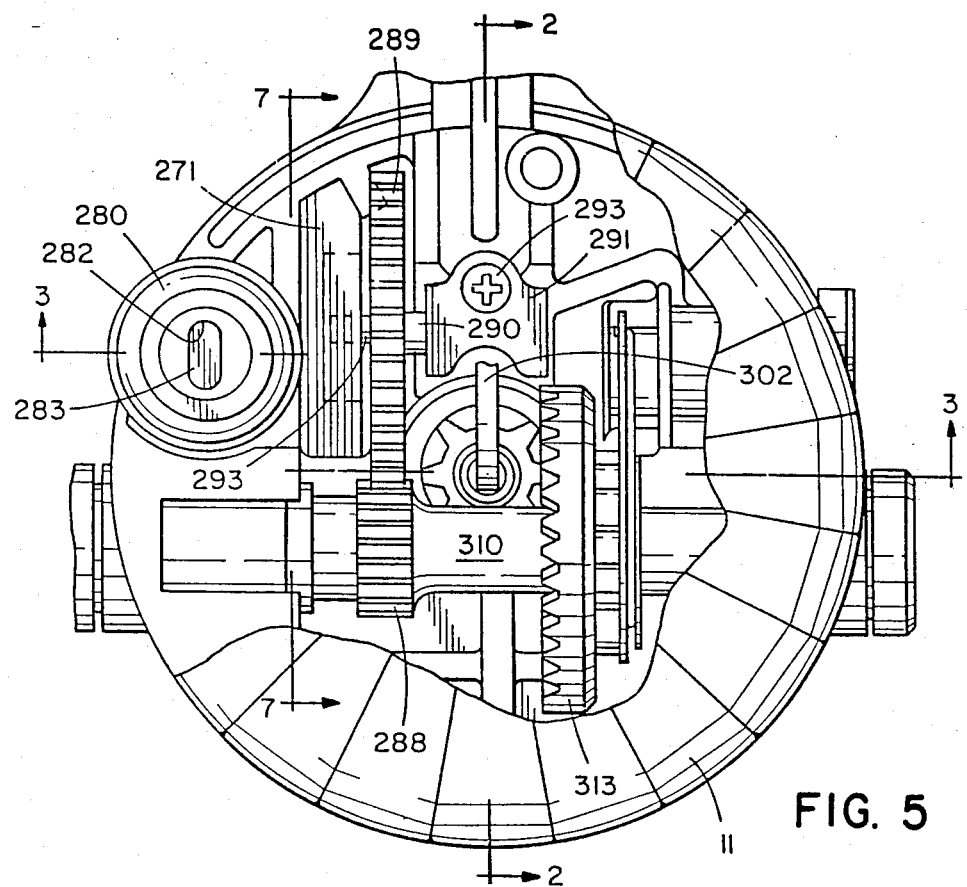
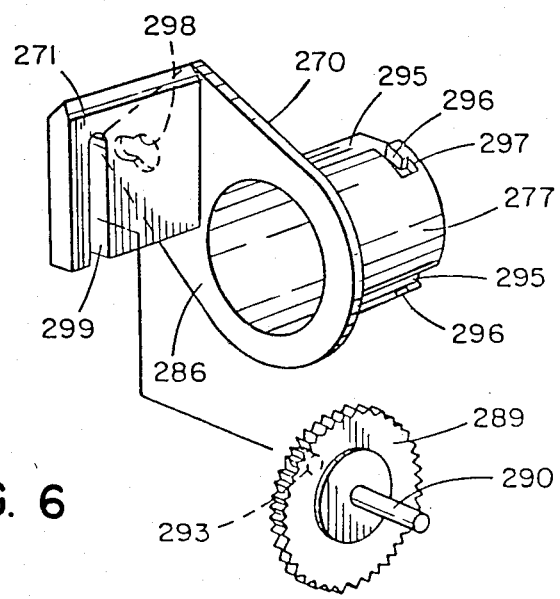
FIG. 5
FIG. 6

UNIFORM DRAG SYSTEM FOR SPIN CAST REELS

This is a division of application Ser. No. 289,067 filed July 31, 1981, now U.S. Pat. No. 4,378,914.

TECHNICAL FIELD

This invention relates to a spin casting style fishing reel and, more particularly, relates to a spin casting style fishing reel having an infinitely variable and uniformly applied drag force on the spool of the reel.

Background Art

Spin cast fishing reels have had many different styles and types of drag assemblies for varying tension in a line. One such device is shown in U.S. Pat. No. 3,105,651 to Hull issued Oct. 1, 1963, wherein a drag is provided on the line spool by means of a leaf spring bearing on serrations on a line spool. A stepped cam engages the leaf spring and as the cam is moved the loading of the spring on the spool is increased or decreased. The steps on the cam control the tension which is not always just the tension desired. In addition, the spring and serrations constantly wear on each other, requiring repair or replacement.

Other prior art devices, such as U.S. Pat. No. 3,088,691 to Hull, issued May 7, 1963, use a star wheel to translate an actuator which pivots a pair of links to close a brake sleeve around a hub. The drag is controlled by the degree of binding of the sleeve on the hub. Another Hull patent, U.S. Pat. No. 3,481,554 issued Dec. 2, 1969, uses a thumbwheel to pivot links to open and close a brake member on the spool to vary the drag on the spool. All of the above numerated devices suffer one common deficiency, and that is the tendency to apply the pressure on the spool non-uniformly around 360° of the spool. Therefore, the drag is applied angularly on the spool which cants the spool on the hub causing uneven wear.

The drag mechanisms described in this application are directed toward the problems heretofore encountered and constitute an improved design eliminating the unevenly applied drag of existing systems.

Disclosure of the Invention

This invention relates to spinning style fishing reels and comprehends a simple but effective drag assembly for varying the drag on a line spool. A clutchwheel or thumbwheel is used to rotate a shaft carrying a gear which meshes with a second gear or geared clutch rotatably mounted about the hub of the reel. First cam means are provided on the second gear or geared clutch which mate with second cam means fixed against rotation relative to the hub so that rotation of the thumbwheel rotates the second gear and first cam means relative to the second cam means to move the second gear axially along the hub. A spool carried by the hub receives increased or decreased axial force from the second gear means to increase or decrease the drag on a line being withdrawn from the spool.

The interacting cam means moves the second gear in a plane substantially parallel to a plane containing one face of the spool so that uniform pressure is applied in a direction around substantially 360° of the spool, which uniformly applied pressure or drag will not cant the spool relative to the hub, thereby eliminating wear and subsequent binding problems. The improved drag assembly is relatively inexpensive to manufacture, is simple to install and is substantially trouble free, requiring little or no maintenance.

In one embodiment, an axially oscillatable spool carrier is provided and has a sleeve encircling the hub with a flange extending transverse thereto. The sleeve receives the spool and second gear with the first cam means, which first cam means engages a second cam means carried by the flange whereby the drag on the spool can be varied uniformly. The oscillatable spool carrier is oscillated by an oscillator gear plate on the oscillatable spool carrier and by a pinion on the crank assembly.

BRIEF DESCRIPTION OF THE DRAWINGS

FIG. 5 is a front elevational view with parts of the front cover broken away to reveal the relationship of parts of the invention;

FIG. 6 is an exploded perspective view of an oscillatable spool carrier and a drive gear therefor;

DESCRIPTION OF THE BASIC STRUCTURE AND OPERATION OF FISHING REEL

Figure 1:
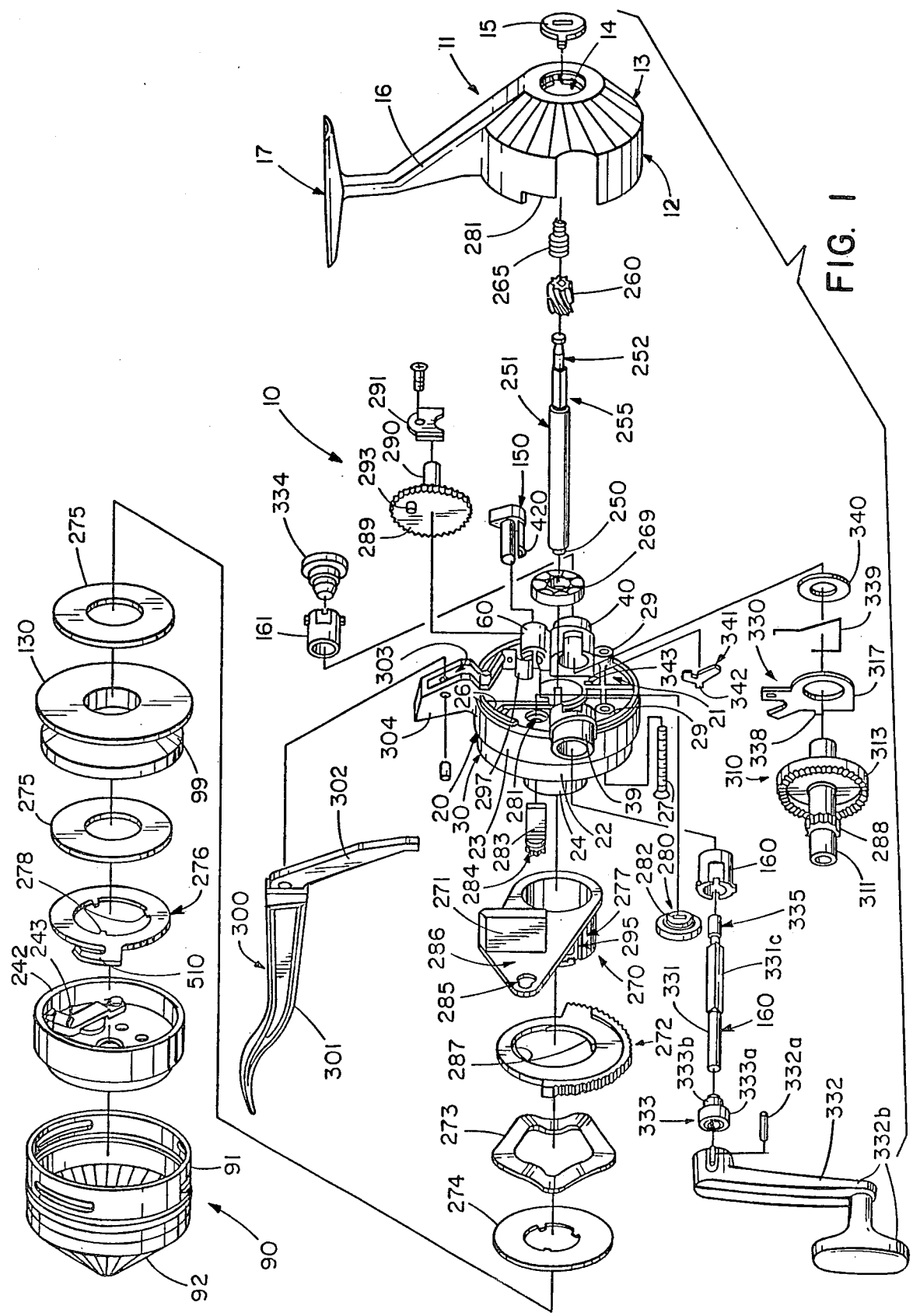
FIG. 1 is an exploded perspective view of a spin casting style fishing reel employing the improved spool drag mechanism.

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semi-spherical rear wall 13 having a center opening 14 in which is seated a back cap 15. A stem 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23.

A central hub 24 projects forward of the deck plate 21 with an oscillatable spool carrier 270 mounted on the hub for axial oscillating movement relative to the hub. The spool carrier 270 is keyed by plate 271 to the deck plate 21 to permit the oscillating movement, with said plate 271 preventing rotation of the spool carrier 270 relative to the hub 24. A geared clutch 272, a wave spring or clutch ring 273, a stainless steel washer 274, a flat drag washer 275, the spool 130, a second flat drag washer 275 and a dual spool clip and clicker 276 all surround a sleeve 277 on said spool carrier 270. The spool clip 276 has lugs 278 which engage with grooves 295 in the sleeve 277 of the spool carrier 270 for retaining the spool and related associated parts on the spool carrier 270.

The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole in the hub 24 with a spinner head assembly 242 threaded by means of a threaded opening on the forward threaded end 250 of the shaft 251. The spinner head assembly 242 partially surrounds the forward flange of the spool assembly 130 with fishing line 99 being wound thereon. The coneshaped front portion 92 of the front cover 90 has a front hole (not shown in FIG. 1) which acts as a fishing line guide as the line 99 is cast from the reel 10 and rewound after casting.

A clutch wheel 280 projects partially through an opening 281 in the side wall of the edge of the back support housing 11 and has a shaped slot 282 through the mid-portion thereof through which a shaped shaft 283 is slidably received. The shaft 283 extends through the deck plate 21 and has a clutch pinion 284 on the front end thereof. The shaft 283 is rotatably mounted in the opening 285 in the flange 286 of the spool carrier 270. The pinion 284 meshes with the gear of the geared clutch 272. Cams 287 on the geared clutch 272 engage with mating cams (not shown in FIG. 1) on the spool carrier 270. Rotating the clutch wheel 280 rotates the geared clutch 272 to move the cams relative to each other to move the geared clutch 272 axially along the sleeve 277 of the spool carrier 270. Movement of the geared clutch away from the flange 286 of the spool carrier 270 will increase the drag or clamping force on the spool 130 while movement in the opposite direction will decrease the drag or clamping force on the spool 130, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 255 of the center shaft 251 and is resiliently maintained in a forward position against the deck plate 21 by a center shaft spring 265. The pinion gear 260 and the center shaft 251, being splined together, will have relative axial sliding motion, but rotation of the pinion gear 260 will rotate the center shaft 251. The spring 265 bears against an abutting end 252 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rearward end 252 of the center shaft 251. When the exterior operating handle 301 of the finger brake lever 300 is pulled upward toward the mounting foot 17, operating leg 302 engages the end 252 of the center shaft 251. The center shaft 251 and the spinner head assembly 242 mounted thereon are pushed forward relative to the bearing 269 and the hub 24. A pickup pin mechanism 243, mounted on and within spinner head assembly 242, is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an anti-reverse assembly 330 and a pinion gear 288 for the oscillatable spool carrier 270, both of which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion of the shaft 251 disengages the pickup pin mechanism 243 from the forward face of the cam (not shown in FIG. 1) on the hub 24, causing the spinner head assembly 242 to move rearward as the pickup pin mechanism 243 rides up the cam (not shown in FIG. 1) to extend the pickup pin 245 outwardly beyond the spinner head assembly 242 so that the rotation of the crank handle 332 will rotate the spinner head assembly 242 to wind the fishing line 99 on the spool assembly 130.

The crankshaft 311 has the pinion gear 288 either integrally formed or keyed thereon, with the pinion gear 288 meshing with an oscillator gear 289 mounted on a shaft 290 which shaft is rotatably mounted by retainer 291 to a pillow block 292 formed on the deck plate 21. A pin 293 on the oscillator gear 289 engages in a slot (not shown in FIG. 1) in the plate 271 on the spool carrier 270 with the slot extending along an axis transverse to the axis of the shaft 251. Rotation of the crank handle 332 will rotate the oscillator gear 289 which in turn will oscillate the spool carrier 270 and spool 130 back and forth along the shaft 251 as the spinner head assembly 242 is rotating about the axially oscillating spool 130.

Crank assembly 310 is coupled with an anti-reverse assembly 330, which comprises a ratchet (not shown) mounted on the crankshaft 311 against the back side of face gear 313, an anti-reverse drag arm 317 having a transverse lug 338, a drag spring 339 and spacer washer 340 all mounted on the hollow crankshaft 311. An anti-reverse pawl 341 having a pivot tang 342 pivotally mounted in an aperture 343 in the deck plate 21, is positioned against the back of the face gear 313 between the deck plate 21 and the transverse lug 338 on the drag arm 337 for engageable and disengageable contact with the ratchet.

Anti-reverse actuator 150 is mounted in upper housing sleeve 60 that opens through the wall of the rearward body portion 23 of body 20 and the actuator 150 is retained in the sleeve 60 by an integrally formed lip 420 on the actuator 150 which snaps beyond the edge of the sleeve 60. The anti-reverse actuator 150 is in cooperative contact with the anti-reverse drag arm 317. In one position, the actuator 150 disengages the anti-reverse assembly 330 permitting the crank rod 331 and the crank assembly to rotate in either the forward direction (upward toward the stem 16) or the reverse direction (downward toward the stem 16 toward the back of the reel 10). In a second position of the actuator 150, the crank assembly cannot be rotated in the forward direction.

Description of the Preferred Embodiments

Figure 2:
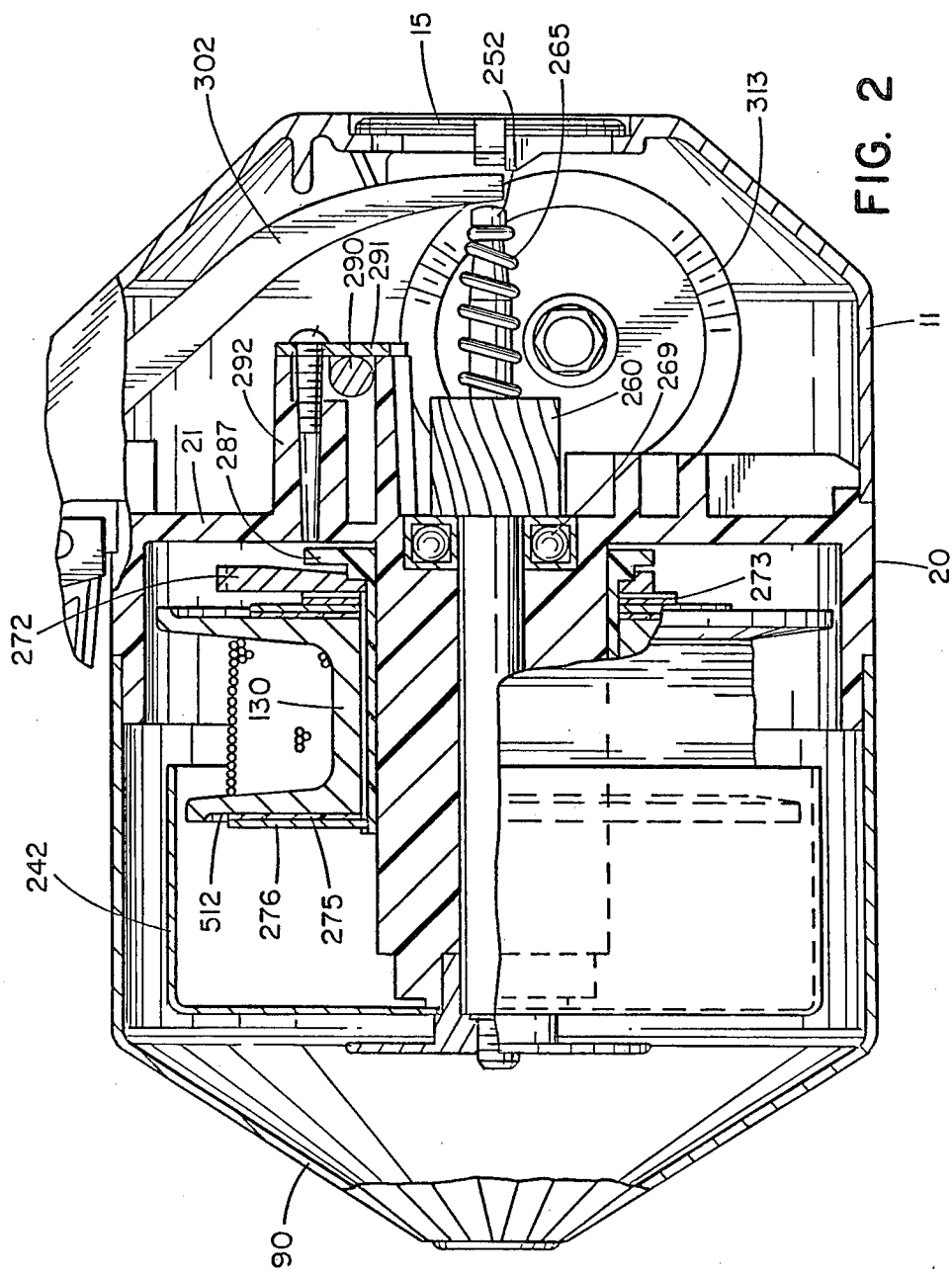
FIG. 2 is a partial vertical sectional view of the reel taken along the lines 2—2 of FIG. 5.
Figure 3:
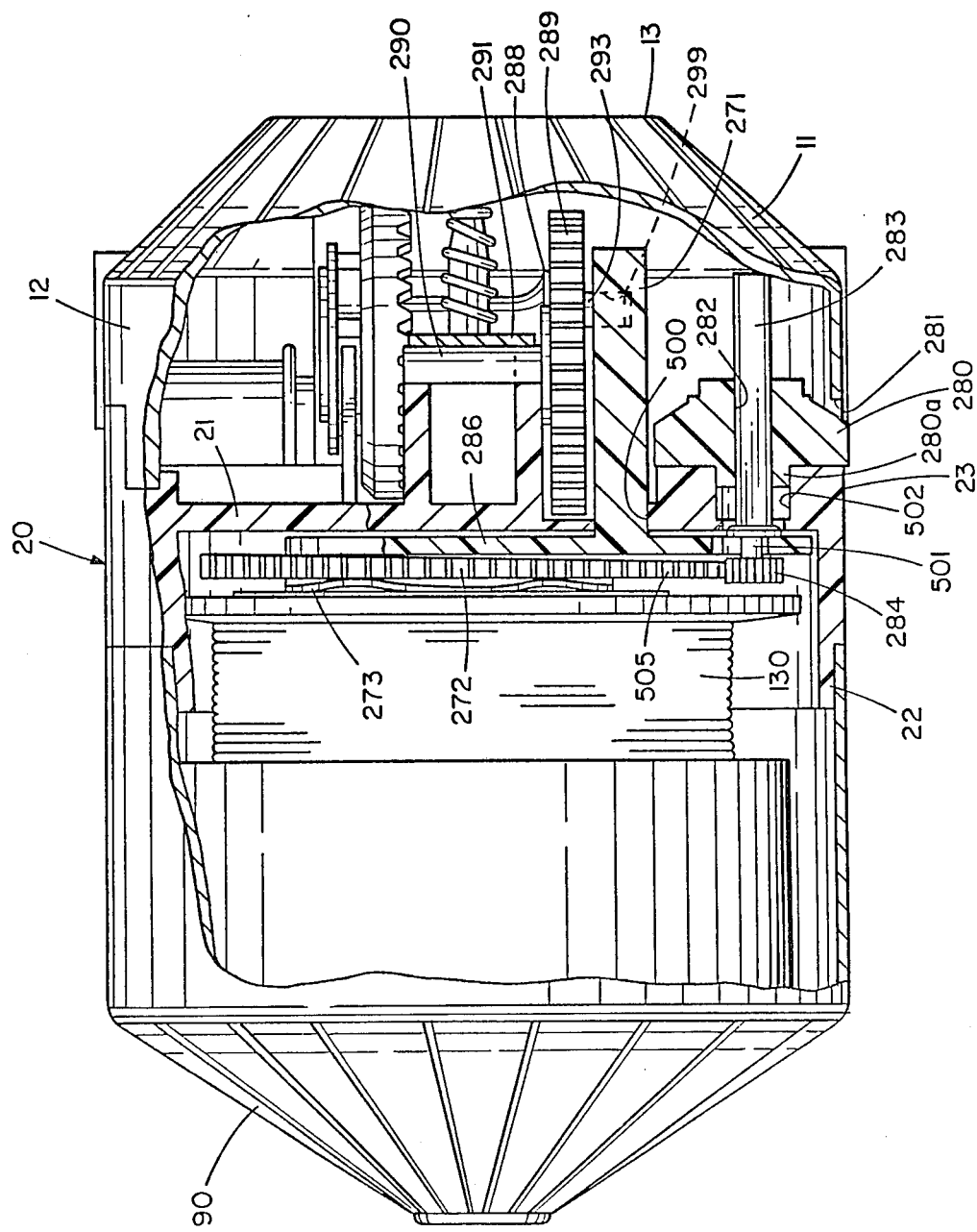
FIG. 3 is a partial horizontal sectional view of the reel taken along the lines 3—3 of FIG. 5.
Figure 4:
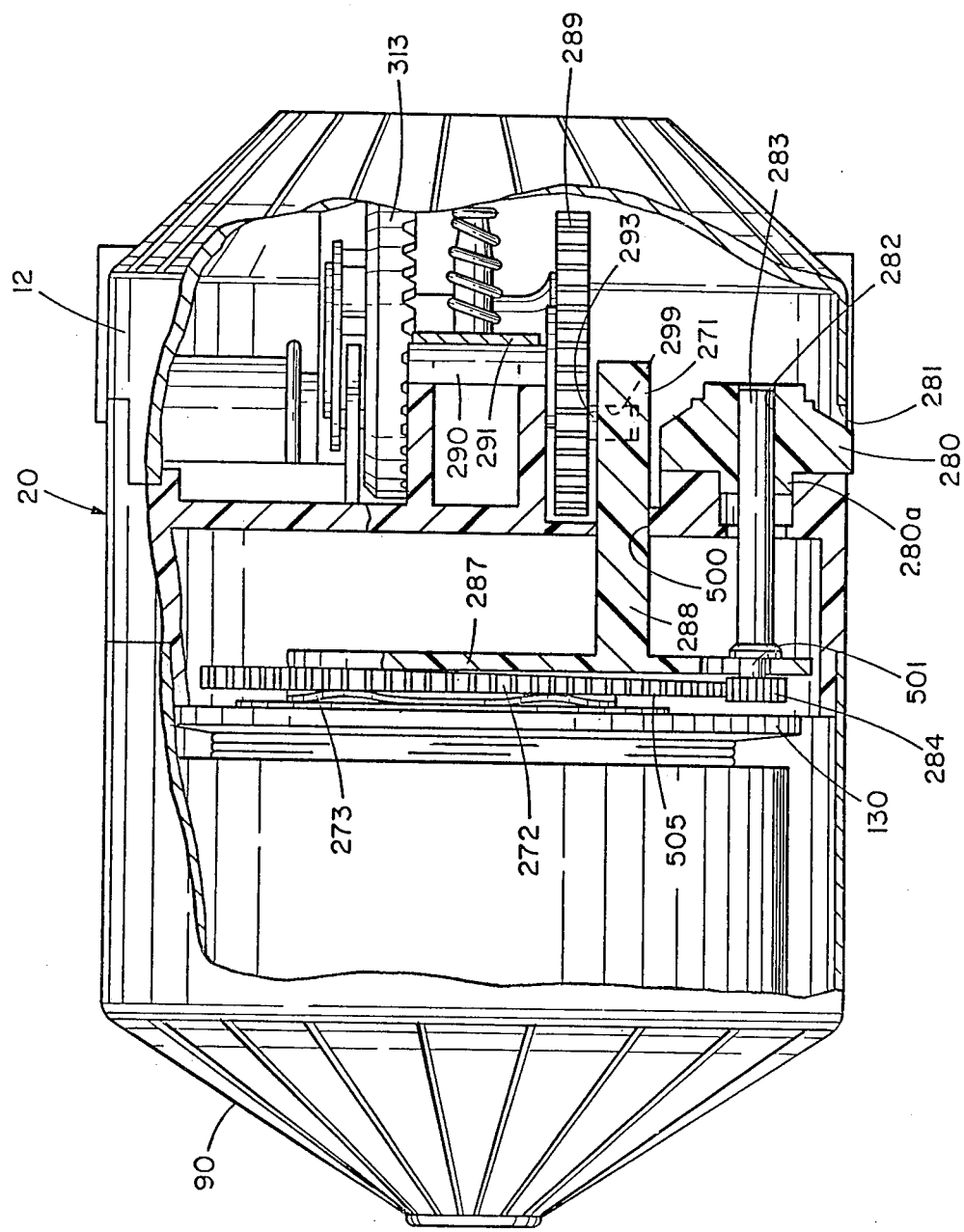
FIG. 4 is a sectional view similar to FIG. 3, only with the spool moved to a forward position.
Figure 7:
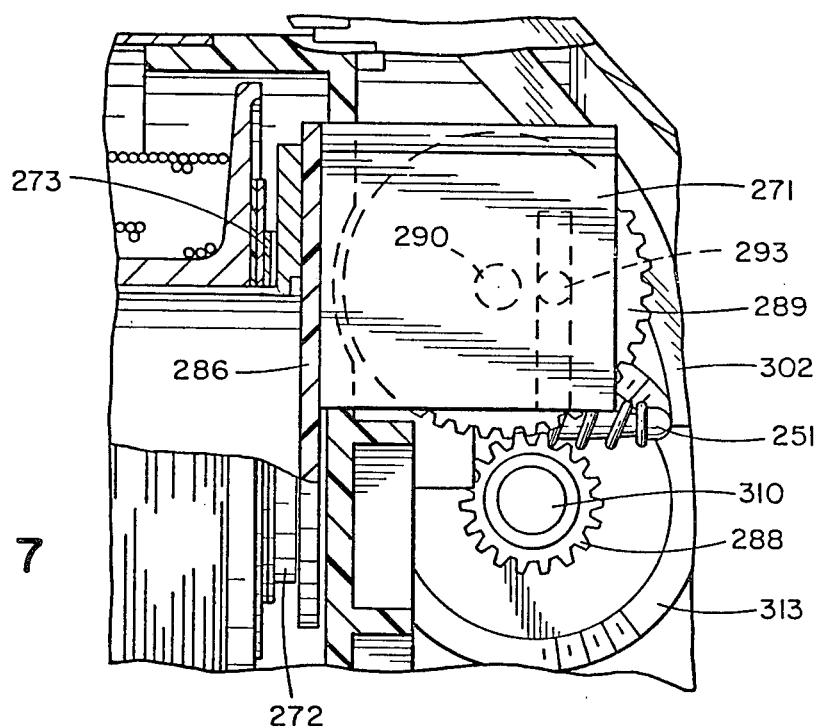
FIG. 7 is an enlarged broken away sectional view taken along the line 7—7 of FIG. 5 showing the oscillatable spool carrier in position in the reel.
Figure 8:
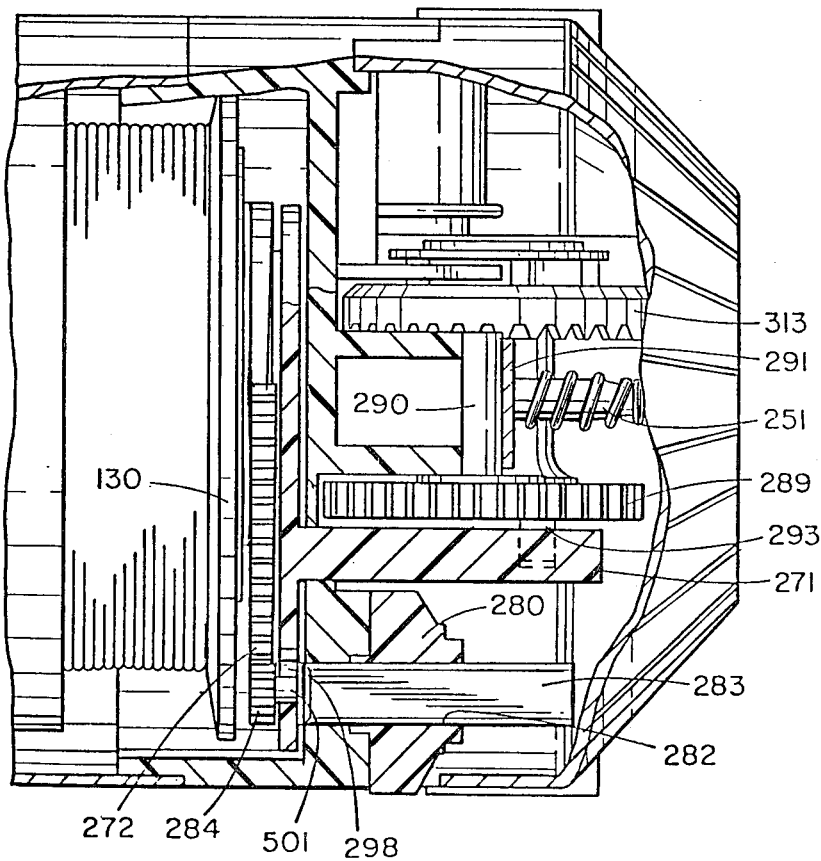
FIG. 8 is a sectional view similar to FIG. 3, only with the clutchwheel and a second gear in a different adjusted position for applying increased drag on the spool.

Turning to FIGS. 2-12, inclusive, the construction of a preferred form of uniform drag mechanism for a spin cast reel is illustrated. In particular, FIGS. 2, 3 and 5 shown the drag mechanism in enlarged assembled form, with FIGS. 6, 7 and 9 through 12 showing enlarged details thereof. FIGS. 4 and 8 show the mechanism of FIGS. 3 and 2, respectively, in different operating positions. The oscillatable spool carrier 270, as shown in FIG. 6, is composed of the sleeve 277 attached to the transversely extending, tear drop shaped flange 286 which in turn is attached to the transversely extending plate 271. The plane of the plate 271 lies parallel to the axis of the hollow opening 294 in the sleeve 277. The sleeve 277 has three axially extending grooves 295 in the outer periphery thereof with one of the grooves being chordal on one side and the remaining two having two side walls. A transversely extending slot 296 intersects with each groove near the outboard end of the sleeve. As can best be seen in FIGS. 6 and 12, each slot 296 has an undercut 297 in the outboard side of the slot. The flange 286 has a keyhole shaped aperture 298 in the narrowed end portion remote from the sleeve 277 with the large opening of the key located on the sleeve side of the flange. The plate 271 has a slot 299 formed in one face thereof with the axis of the slot 299 lying in a plane transverse to the axis of the sleeve 277.

Figure 9:
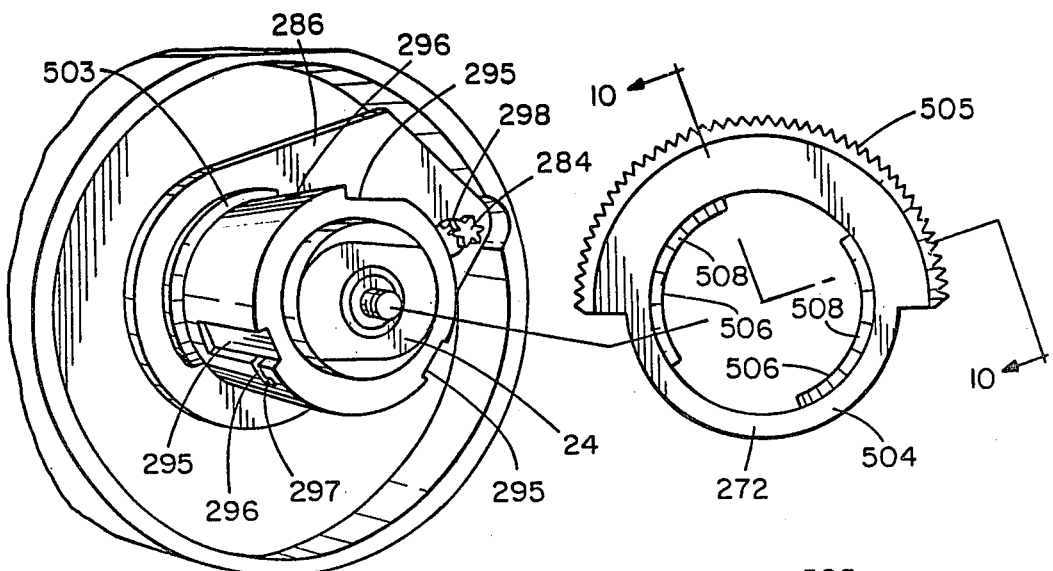
FIG. 9 is a perspective exploded view of the oscillatable spool carrier on the hub and deck plate of the reel with the second gear exploded therefrom.
Figure 10:
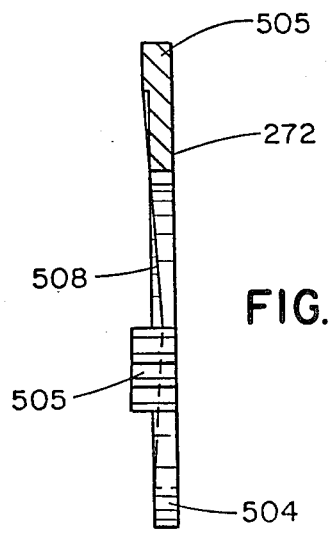
FIG. 10 is a cross-sectional view of the second gear taken along the lines 10—10 of FIG. 9.
Figure 11:
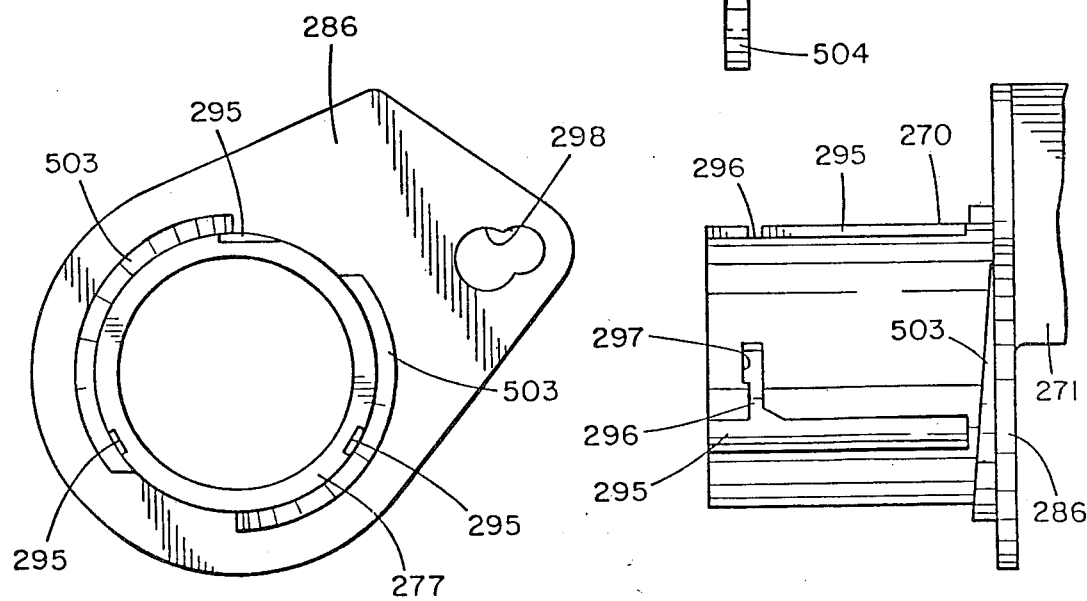
FIG. 11 is a front elevational view of the oscillatable spool carrier showing the cam surfaces thereon.
Figure 12:
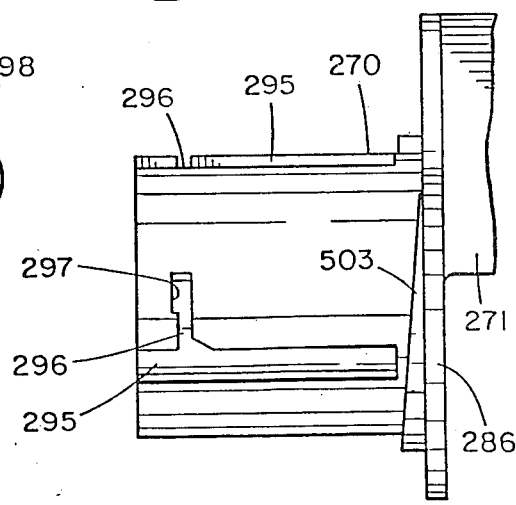
FIG. 12 is a side elevational view of one portion of the oscillatable spool carrier.

With the spool carrier 270 assembled on the hub 24, see FIG. 9, the flange 286 lies parallel to the deck plate 21 of the body 20 with the plate 271 passing through an elongate slot 500 in the deck plate 21, see FIG. 3. Prior to assemblying the spool carrier 270 on the hub 24, the clutch pinion 284, which has a reduced diametered portion 501 between the pinion 284 and the shaped shaft 283 is inserted through the large portion of the keyhole 298 and is moved transverse to the plane of the flange until said reduced diameter portion 501 is seated in the small portion of the keyhole. The shaped shaft 283 lies parallel to and spaced from the plate 271. With the clutch pinion 284 and shaft 283 seated in the small portion of the keyhole, the shaft 283 and spool carrier 270 are assembled with the body 20 by aligning the sleeve 277 with the hub 24 as the plate 271 is inserted in aperture 500 and the shaft 283 is inserted in an aperture 502 in the deck plate 21. The spool carrier 270 is moved toward the deck plate until the flange is in juxtaposed relation to the deck plate. The clutch wheel 280 is assembled with the shaped shaft 283 by inserting the shaped shaft into shaped opening 282 in the clutch wheel 280. The clutch wheel 280 has a forwardly extending pilot bearing 280a which seats in bore 502 to align and support the shaft 283 and clutch pinion 284. Pilot bearing 280a also provides a bearing surface about which the clutch wheel 280 turns.

At the junction between the flange 286 and the sleeve 277 on the spool carrier 270 are a pair of cam surfaces 503 with the inclines of the cam surfaces advancing along the axis of the sleeve. One cam surface 503 has a high point and a low point spaced 180° from the high point and low point, respectively, of the other cam surface. As shown particularly in FIGS. 9 and 10, the geared clutch 272 has a planar body portion 504 with a geared segment 505 extending approximately 180° around the periphery thereof. As will be noted in FIGS. 3 and 4, the axial dimension of the gear teeth of the gear segment varies from a minimum as noted at the lower portion of FIGS. 3 and 4 to a maximum at the upper portion thereof. A pair of matching ledges 506 project into the opening 507 in the center of the body portion 504 with an inclined cam surface 508 formed in one axial face of each. Each cam surface 508 has a high point and a low point spaced 180° from the corresponding high point and low point, respectively, of the other cam surface. With the geared clutch 272 assembled on the sleeve 277 of the spool carrier 270, the cam surfaces 508 will engage with the cam surfaces 503 on the spool carrier. The clutch pinion 284 will mesh with the geared segment 505, see FIGS. 3, 4 and 8. The increased axial dimension of the gear teeth on the segment 505 of geared clutch 272 is to accommodate for the increased spacing between the flange 286 and the geared clutch 272 as the cam surfaces 503 and 508 move toward a high point contact on each, FIG. 8.

With the geared clutch 272 on the sleeve 277 and oriented so that the low points on the cam surfaces 503 engage the high points on cam surfaces 508, whereupon the relative spacing between the flange 286 and the geared clutch 272 is a minimum, the wave spring or clutch ring 273, washer 274, drag washer 275, spool 130, and drag washer 275 are assembled on the sleeve 277. The spool clip 276 is assembled on the sleeve by aligning the lugs 278 with the grooves 295, and urging the spool clip toward the deck plate thereby depressing the wave spring 273 until the lugs 278 line up with the transverse slots 296. The spool clip 276 is then turned relative to the sleeve until the lugs seat in the undercut 297. Turning the clutch wheel 280 in an appropriate direction will rotate the cam surfaces 508 on the geared clutch 272 relative to the cam surfaces 503 on the flange 286 to shorten the distance between the geared clutch 272 and the spool clip which depresses the wave spring 273 and increases the drag forces on the spool 130. Turning the clutch wheel 280 in the opposite direction will reduce the drag force on the spool.

To provide an audible sound when the line 99 is pulled from the spool 130 with the drag operative, the spool clip and clicker 276 has a dual function. The clicker arm 510 has the axially rearwardly bent tip 511 which engages in serrations 512 formed around the one face of the spool. As the line 99 is pulled from the spool, the spool will rotate on the sleeve 277 relative to the stationary spool clip and clicker 276, with the tip 511 producing an audible clicking sound. The level of the sound will not materially vary no matter what the degree of drag being applied to the spool.

The improved reel 10 has an additional unique apparatus for oscillating the spool 130 along the hub for applying a lead to the line as it is wound on the spool. Specifically, the crankshaft 311 has the pinion gear 288 in meshing relationship with the oscillator gear 289. The oscillator gear 289 is mounted on shaft 290, which is rotatably supported on the pillow block 292 by the retainer 291 screwed to the block 292 over the shaft 290. The pin 293 on the oscillator gear 289 engages in the slot 299 in the plate 271 on the spool carrier 270. The plate 271 projects through the opening 500 in the deck plate and is engaged by the pin 293 rearward of the deck plate. Since the pin 293 is offset from the pivot axis of the oscillator gear 289, it will ride up and down in the slot 299 as it goes from one extreme to the other, giving an axial movement to the spool carrier 270. The axial movement, being back and forth, will provide the oscillating motion to the spool carrier 270 and to the spool 130. The spool carrier 270 is restrained against rotational movement relative to the hub by means of the plate 271 passing through the aperture 500 in the deck plate. As the spool is oscillated during winding of the line, the pickup pin 243 on the spinner head assembly 242 will feed line to the spool in a spiral fashion thereby affording a more even distribution of the line on the spool.

FIG. 3 illustrates the oscillatable spool 270 in the rearmost position with the geared clutch 272 in a fully retracted position relative to the oscillatable spool 270. In the FIG. 3 position, the shaft 283 of the drag adjusting mechanism has moved a substantial distance rearward through the clutchwheel 280. In FIG. 4, the oscillatable spool carrier 270 has been moved to its forwardmost position with the shaft 283 of the drag mechanism moved forward through the clutchwheel 280. The back support housing 11 has the cutout 281 which fits around the clutchwheel or thumbwheel 280 so that when the back support housing 11 is attached to the body 20 by the screws 27, the clutch wheel 280 will be retained in position on the reel. The clutch wheel 280, due to its splined or shaped interfit with the shaft 283 may be used to rotate the shaft 283 and geared clutch 272 for adjusting the drag on the spool at any position of the oscillatable spool carrier 270. Likewise, the oscillatable spool carrier 270 may be oscillated by rotating the crank handle 332 completely independent of the drag setting of the clutchwheel 280 and geared clutch 272.

Figure 13:
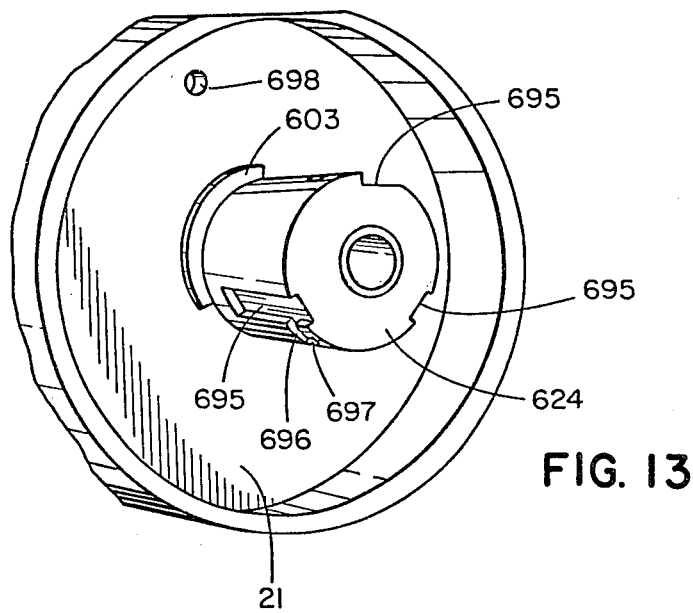
FIG. 13 is a perspective view of a portion of a reel body with all loose parts removed showing a modified form of cam surfaces adjacent the hub projecting from the deck plate.
Figure 14:
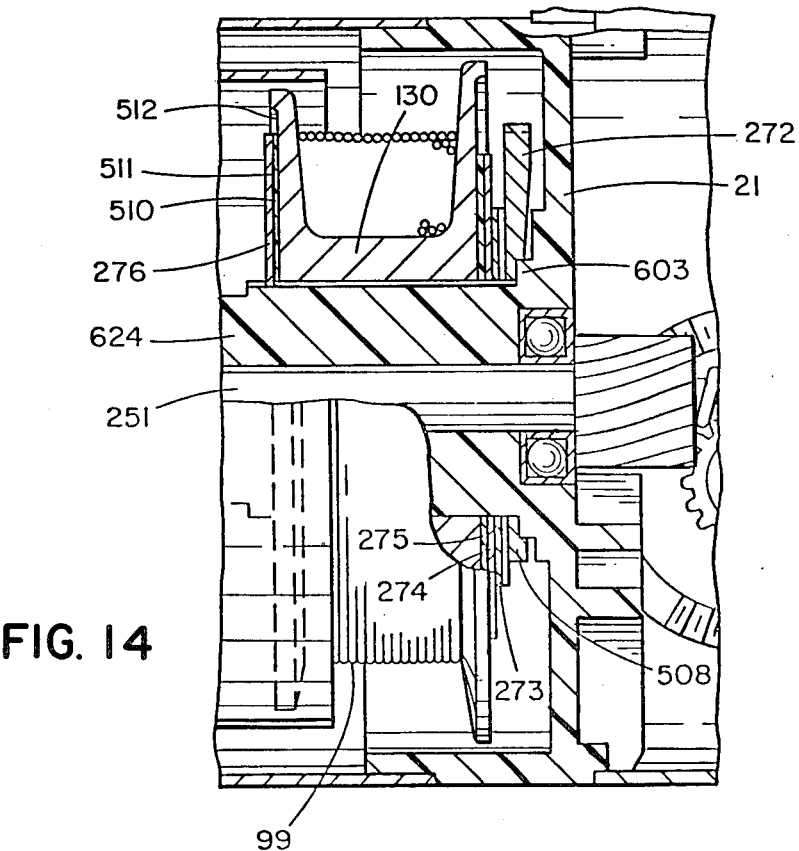
FIG. 14 is a cross-sectional view of the modified form of drag varying mechanism taken along a sectional line similar to FIG. 2.

A modified form of invention is shown in FIGS. 13 and 14, wherein one set of cam surfaces 603 are provided on the deck plate 21 at the base of the hub 624 with the cam surfaces 603 facing axially of the hub. The geared clutch 272, is of the same construction as described above and encircles the hub 24 with the cam surfaces 508 on the geared clutch engaging the cam surfaces 603 on the deck plate. The hub 624 has axial grooves 695 with intersecting undercut slots 696. A clutch wheel 280, shaft 283, reduced diametered portion 501 and clutch pinion 284 are assembled in the same manner as described hereinabove with the clutch pinion 284 being threaded through opening 698 in the deck plate 21 so that the gear teeth of geared clutch 272 can mesh therewith when the geared clutch is assembled on the hub 624.

A clutch spring 273, washer 274, drag washer 275, spool 130 and drag washer 275 are assembled over the hub 624 with the clutch spring 273 bearing against the geared clutch 272. A spool clip and clicker 276 with lugs 278 aligned with the grooves 695 is pressed on the hub and rotated when the lugs 278 align with the slots 696 whereupon initial pressure or drag is applied on the spool by the wave or clutch spring 273. Turning the clutchwheel 280 will advance or retract the geared clutch 272 as the cam surfaces 508 on the geared clutch 272 rotate relative to the stationary cam surfaces 603 on the deck plate 21.

The force applied by the geared clutch 272 and spring 273 urging the drag washers 275 against the spool 130 provides drag to the spool. The geared clutch 272 is advanced in a plane substantially perpendicular to the axis of the shaft 251 so as to apply uniform force over 360° of the spool, thereby eliminating canting of the spool or binding of the spool on the hub.

Industrial Applicability

A spin cast fishing reel is provided which has an improved drag mechanism that applies force uniformly around 360° of the spool. Mating cam surfaces (503, 508, 603) are provided on a geared clutch 272 and on a member fixed against rotation relative to the body of the reel. A clutchwheel 280 is rotated to rotate a clutch pinion 284 which rotates the geared clutch 272 and one cam surface 508 relative to the other cam surface 503, 603 for moving the geared clutch 272 axially relative to the fixed member. A spring 233 and a spool 130 are rotatable relative to the hub 24 and are resiliently held against the geared clutch 272 by spool clip 276. Turning the clutchwheel 280 will advance or retract the geared clutch 272 to increase or decrease the drag on the spool.

In one embodiment, the cam surfaces 503 are on a spool carrier 270 with the geared clutch 272 and mating cam surfaces 508, spring 273 and spool 130 rotatable on the sleeve 277 of the spool carrier 270. The spool clip 276 engages in slots 296 in the sleeve 277 to retain the spool on the spool carrier and to provide the backing against which the increase or decrease in the forces act to increase or decrease the drag force on the spool.

In a modified form of the invention, the cam surfaces 603 are on the deck plate 21 with the geared clutch 272 and mating cam surfaces 508, spring 273 and spool 130 being rotatable on the hub 624 carried by the deck plate 21. The spool clip 276 engages in slots 296 in the sleeve 277 to retain the spool on the spool carrier and to provide the backing against which the increase and decrease in the forces act to increase or decrease the drag forces on the spool.

We claim:

1. In a fishing reel including a reel body, a forwardly extending hub having an opening therethrough, a spool carried by the hub forwardly of a portion of the reel body, a center shaft extending axially through the opening in the hub, a crank drive mechanism mounted in the reel body for rotating the center shaft, the improvement including:
   (a) rotatable shaft means mounted within the reel body along an axis lying parallel to the center shaft;
   (b) control means affixed on the rotatable shaft means and having a portion extending outward beyond the surface of the reel body, the rotatable shaft means being rotated by the control means and being movable transversely of the control means;
   (c) a gear affixed on said rotatable shaft means;
   (d) second gear means rotatably mounted about the hub and located between the spool and the portion of the reel body, the second gear means being in meshing relationship with the first named gear; and
   (e) means for moving the second gear means toward and away from the spool upon turning the control means.

2. In a fishing reel including a cylindrical reel body, a forwardly extending hub having an opening therethrough, a spool supported by the hub forwardly of a portion of the reel body, a center shaft extending axially through the opening in the hub, the improvement including:
   (a) rotatable shaft means mounted within the body along an axis parallel to the center shaft;
   (b) control means on the rotatable shaft means and having a portion exposed for contact from outside the reel body;
   (c) first gear means affixed on the rotatable shaft means;
   (d) second gear means meshing with the first gear means and being rotatably mounted about the hub, the second gear means being positioned between the spool and the middle portion of the body;
   (e) first cam means associated with the hub; and
   (f) second cam means cooperatively operable with the second gear means mating with the first cam means whereby turning the control means rotates the second gear means and second cam means relative to the first cam means whereby the face of the second gear means opposite to the first cam means is urged toward or away from the spool to increase or decrease the resistance of the spool to rotation relative to the hub.

3. In a fishing reel including a reel body, a centershaft having at least a portion thereof extending in the reel body, a spool surrounding a portion of the centershaft, a crank drive mechanism mounted in the reel body for winding fishing line onto the spool, the improvement including:
   (a) rotatable shaft means mounted within the body along an axis parallel to the center shaft;
   (b) control means on the rotatable shaft means and having a portion extending outward beyond the surface of the reel body, the rotatable shaft means being rotated by the control means and being movable transversely of the control means;
   (c) a gear affixed on the rotatable shaft means;
   (d) second gear means rotatably mounted about the centershaft and located between the spool and a portion of the reel body, the second gear means being in meshing relationship with the first named gear; and
   (e) means for moving the second gear means toward and away from the spool upon turning the control means.

4. In a fishing reel including a reel body, a centershaft with at least a part in the reel body, a spool surrounding a portion of the centershaft, a crank drive mechanism mounted in the reel body for winding fishing line on to the spool, the improvement including:
   (a) rotatable shaft means mounted within the reel body along an axis parallel to the centershaft;
   (b) control means on said rotatable shaft means and having a portion exposed for contact from outside the reel body;
   (c) first gear means affixed on said rotatable shaft means;
   (d) second gear means meshing with the first gear means and being rotatable relative to the spool, said second gear means being positioned between said spool and a portion of the reel body;
   (e) first cam means associated with the reel body and co-planar with the second gear means; and
   (f) second cam means whereby turning the control means rotates the second gear means and second cam means relative to the first cam means whereby the face of the second gear means opposite to the first cam means is urged toward or away from the spool to increase or decrease the resistance of the spool to rotation relative to the reel body.

* * * * *